3,154,603
PROCESS FOR THE PREPARATION OF SPHERICAL CONTACT PARTICLES

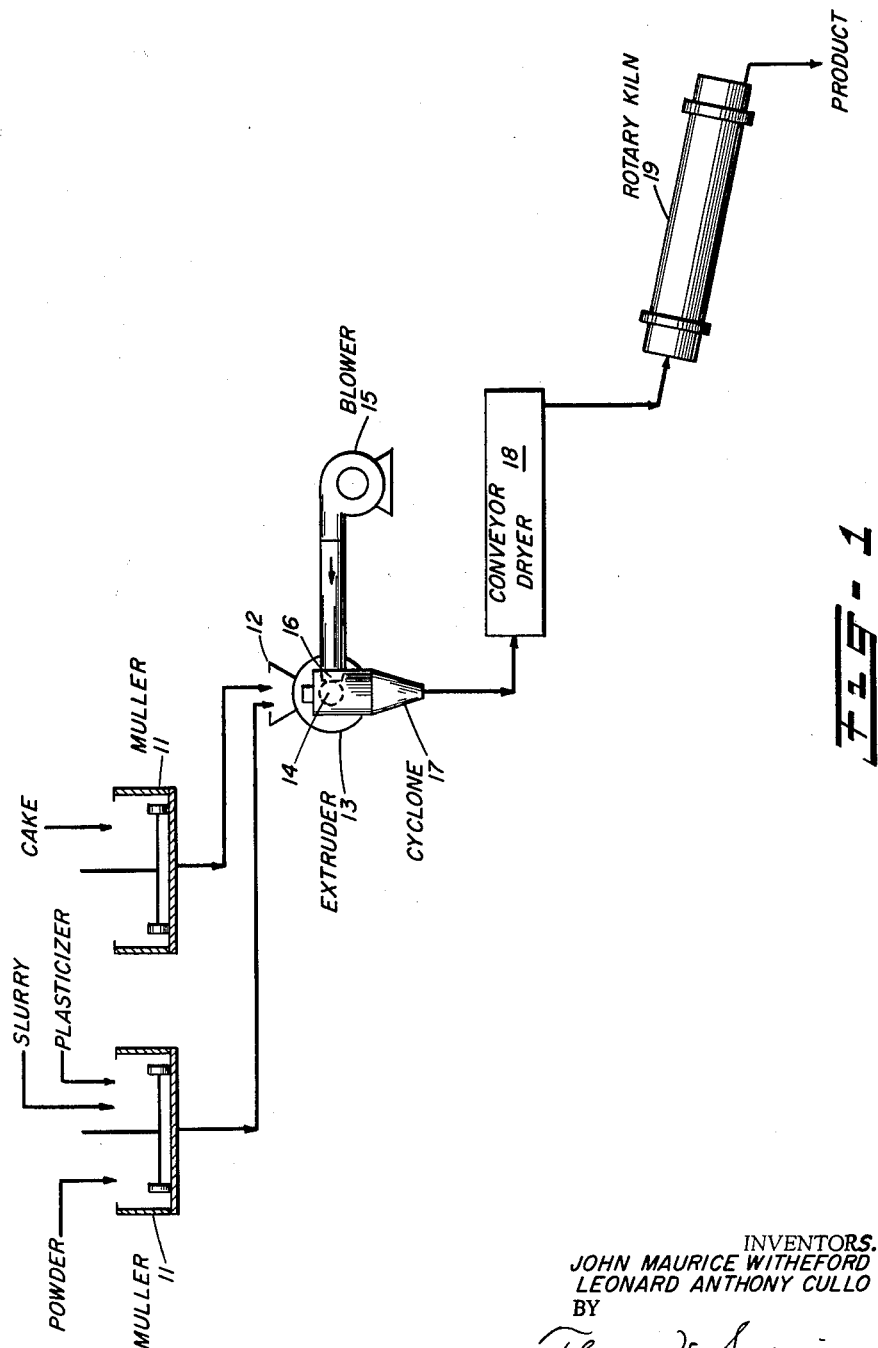

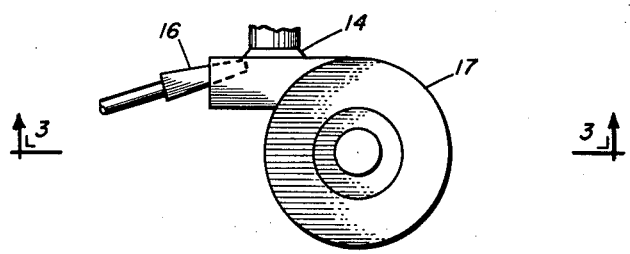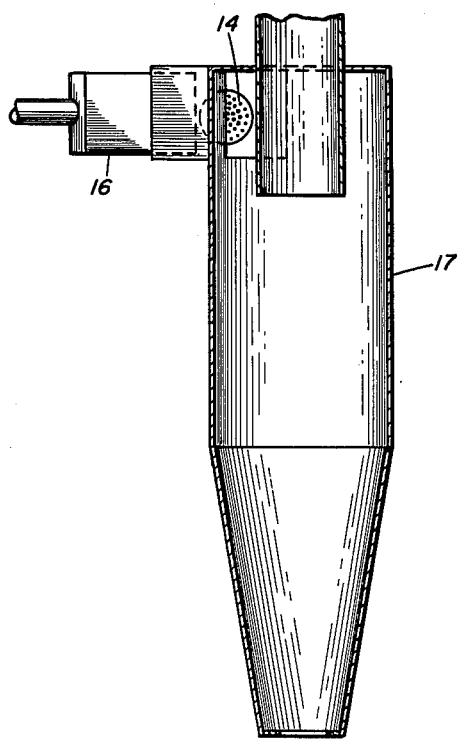

John Maurice Witheford and Leonard Anthony Cullo, Norwalk, Conn., assignors to American Cyanamid Company, New York, N.Y., a corporation of Maine
Filed Aug. 2, 1961, Ser. No. 128,663
13 Claims. (Cl. 264—15)

This invention relates to a process for the production of spherical contact particles. More particularly, it is directed to a process for the production of spherical contact particles having improved attrition resistance and controlled physical properties.

Catalysts have long been used in the petroleum industry in the conversion of hydrocarbons. These catalysts have been used in numerous processes such as reforming, isomerizing, hydrogenating, hydrocracking, dehydrogenating, oxidizing, polymerizing, condensing, and otherwise converting hydrocarbons. Many of these processes employ what are commonly referred to as fixed bed or moving bed catalysts which are distinguished from fluid bed catalysts. In a fixed bed process, the hydrocarbon is passed through a stationary bed of catalyst particles. In many moving bed processes as the hydrocarbon is passed through the catalyst, particles gravitate toward the base of the reactor bed from whence they are conveyed to regenerators and back to the top of the reactor bed for another pass therethrough. Inasmuch as the catalyst particles in such operation are continuously colliding and rubbing over each other, the exposed edges and nonuniform surfaces of the catalyst particles are frequently fragmented with the formation of fines which are carried off by the gas stream. Moreover, while molded and extruded pellets, broken pellets and the like are customarily used in many processes, such pellets are not suitable in certain operations because of the mechanical nonuniformity, because of uneven packing in the bed and because of the extensive attrition of particles due to exposed rough edges. It has been well recognized that heavy losses in a reactor due to the creation or presence of excessive fines therein may be a function of the shape and hardness of the catalyst particles employed. For this reason, it is evident that in fixed and moving bed processes the use of stronger, substantially spherical or bead shaped catalysts will markedly reduce losses due to attrition. Moreover, these bead shaped particles are capable of packing well to form a homogeneous bed which minimizes channeling of fluids and promotes uniformity in contacting.

In the past, numerous methods have been devised and employed for the preparation of spherical catalyst particles. Numerous refinements of the basic process for their preparation have been advanced. In general, catalysts of this type are produced by suspending drops of aqueous gel-forming liquid in a water immiscible liquid for a sufficient time so that the drops set. The setting is usually accelerated by heating and by a change of pH. The aqueous liquid in addition to containing soluble materials may additionally include insoluble materials such as initially produced gelatinous precipitate or a finely divided powder of any desired composition. After setting, the beads are withdrawn from the aqueous phase and are slowly dried until free of excess moisture. The dried particles are then calcined. Control of particle size has long been a problem in this method of preparation of spherical or beaded type catalysts. If there are any substantial variations in the size of the drops formed, the larger drops tend to fall through the suspending liquid at a greater rate than the smaller drops. Accordingly, particles are produced which have extremely large variations in size. When such particles are larger than the average particle size, splitting and fracturing of the particles during the subsequent drying and heat treating operations frequently arise. If the catalyst particles are much smaller than the average, they are likely to be carried out of the reactor by the gas stream just as fines formed by attrition.

We have now discovered that spherical contact masses having superior attrition resistance and controlled physical properties may be obtained in a surprisingly straightforward, continuous method which may be carried out in simple equipment thereby reducing the manufacturing cost of spherical or beaded catalyst particles.

In accordance with the process of this invention particles of desired shape, size and hardness are prepared by expressing a deformable plastic contact mass through an orifice to form a deformable plastic extrudate; successively breaking off the expressed extrudate to form deformable plastic cylinders; shaping said deformable plastic cylinders in a fluid medium by means of centrifugal forces to form substantially spherical bodies and drying said bodies to obtain spherical contact particles.

This process enables one to control physical properties such as surface area, pore volume, pore diameter, etc. of beaded catalysts by controlling not only the variables in the gel manufacturing stage in well known manners but also by suitable variation of the plastic mass prior to extrusion.

It has also been found that not only does the spherical shape of the particles impart improved attrition characteristics but also because the particles are formed by expressing, shaping and drying the deformable plastic contact mass while in a hydrous state, the bonding forces between the microscopic particles making up the mass are increased thereby resulting in higher intrinsic hardness.

Since the diameter of the orifice through which the deformable contact mass is expressed and the length of the deformable plastic cylinders may both be varied considerably, spherical contact particles having a wide range of diameters may be obtained by the process of this invention. Beaded catalyst particles ranging in diameter from about $1/50$ inch to about $1/2$ inch may be made by our process. Spherical contact particles made by our process are thus useful in all of the known catalytic processes, either fixed or moving bed, in which the catalyst particles are subjected to a markedly high degree of attrition.

As employed herein, the expression "deformable plastic" is used in the sense that the mass is capable of being deformed continuously in any direction and remains in such state until the spherical mass is dried or otherwise heat treated. In a more particular manner, the expression covers inorganic gels which have been prepared from sols. Such inorganic gels are illustrated by silica gel, alumina gel, silica alumina gel, silica magnesia gel and mixtures of these gels with other catalytic ingredients e.g., vanadium, copper, platinum, palladium, rhodium, iron, nickel, cobalt, molybdenum, chromium and the like and their oxides. However, the expression is also intended to cover inorganic hydrogels as the term is commonly understood to those skilled in the art as well as precipitated gels and hydroxides formed from various inorganic oxide salts. By this expression is also meant various natural clays and activated clays such as are obtained by the acid treatment of types of kaolin and diatomaceous earths having a high content of silica. Extenders, fillers, lubricants, and surface active agents may also be incorporated in the deformable plastic mass so as to improve processing characteristics and the final physical properties.

As used herein, the step of the process which is concerned with the expression of the deformable plastic contact mass through an orifice is intended to define but not limit the preparation of a continuous extrudate such as would be obtained by forcing the mass through a die. It will thus be seen that the method of the present invention has as one of its steps the forming of spaghetti-like material by the extrusion thereof through a die having a plurality of openings or orifices.

While the term "spherical" as employed herein is generally intended to embrace a mass having a true rounded shape, nevertheless, it is also intended to embrace within the definition of said terms, particles which do not possess perfectly rounded configurations. Thus, depending upon various operating conditions employed in the process of the present invention it is possible that there will be obtained spherical particles having a more or less spheroidal configuration. Contact particles having this particular shape will generally by obtained when the length of the cylinders obtained during the slicing step is substantially greater than the diameter of the finished contact particle.

The extrusion of catalytic masses to form pellets is a well known procedure in the catalyst art. In our process, however, the extrusion or expressing step is but one vital and necessary step of an over-all continuous process for the preparation of spherical contact particles as a feasible commercial operation.

Careful control of the solids content of the deformable plastic contact mass has been found to be essential prior to and during the expressing step in order that the remaining steps of the process may be properly carried out and that the processing characteristics of the finished spherical contact particles are at an optimum. Thus, for example, if the deformable plastic contact mass is too fluid it is extremely difficult to break or slice the extremely soft, pliable and sticky extrudates from the face of the orifice. Conversely, if the deformable plastic contact mass is of a too high solids content, the extrudates themselves are found to be powdery and large amounts of fines are formed. Such control is best determined by a consideration of the particular deformable plastic mass, i.e., gel, hydrogel, clay and the like, being treated in accordance with the process of this invention. However, we have further found that the solids content range in which the mass has desirable plasticity may be appreciably broadened by the addition thereto of a plasticizer, e.g., starches, gums, carboxylated alkylated celluloses, polymers, particularly polyacrylamide, and the like.

The breaking or slicing of the expressed extrudate or spaghetti-like material as obtained from the orifice is readily accomplished by mechanical means, e.g., a rotating knife or by a fluid medium which moves at a velocity sufficiently high to sever off the extrudates as cylinders. The length of such cylinders is related to that of the diameter of the finished spherical contact particles. It is preferable to break the extrudates from the orifice by means of a moving fluid medium whose flow is continuous past the expressing die and which also serves to convey the cylinders thus obtained to the equipment used in the succeeding step of the process, that is the apparatus employed in the shaping of the deformable plastic cylinders by centrifugal forces to form spherical contact particles. While the fluid medium is preferably air, it is possible to employ numerous other fluid mediums such as steam and various organic liquids, e.g., hydrocarbons, mineral oils and the like, provided that the density of the medium is less than that of the particles so as to ensure that the particles will travel a peripheral path in the shaping apparatus.

The shaping step of the process of the present invention is also a critical one in that the deformable plastic cylinders obtained during the breaking or slicing operation are conveyed by means of a moving fluid medium, which may be that also employed for cutting, to an apparatus such as a tapered cylinder, a cyclone separator, or the like wherein centrifugal forces are applied to the plastic cylinders. During the course of travel of the deformable plastic cylinders through this apparatus, a substantially spherical shape is imparted to the cylinders by the vortexing action of the fluid medium which rolls the extrudates around the containing walls of the apparatus at a high rate of speed and with a force proportional to the angular velocity and the diameter of the apparatus for a particle of a fixed mass. It is known, of course, that various contact materials have been formed into spherical masses by agitating and tumbling the same in a device such as, for example, a rotary drum. Since the forces which are applied to the particles during such agitation and tumbling are exclusively gravitational in nature, the time for forming rounded particles in a drum rolling device is ordinarily excessively long. However, utilizing centrifugal forces, which can be made several orders of magnitude higher than gravitational forces, as in the process of this invention, the time for forming spherical masses from bodies other than spherical can be made much shorter. A cyclone device also provides a method for separating the formed particles from the fluid medium which was used to cut, convey and impart velocity to the extrudates and roll them around the cyclone walls.

Following the shaping step, the fluid medium, if a gas, is then discharged from the shaping apparatus and may be recycled to the cutting zone. If the fluid medium is a liquid, it is readily separated from the particles in a conventional manner. The substantially spherical contact particles are then collected from the shaping apparatus and then subjected to a drying operation wherein the free moisture is removed at a relatively slow rate and at a relatively low temperature. The quality of the spherical contact particles may be improved by heat treating the same for several hours at a temperature of, for example, from 500° F. to 1500° F.

It is a feature of the present invention that spherical contact particles of varying sizes be readily obtained. Moreover, the process of the present invention is particularly adaptable for the preparation of generally spherical or spheroidal contact particles having individual particle diameters of from about $\frac{1}{50}$ inch to about $\frac{1}{2}$ inch. While the process of the present invention is effective for producing spherical contact particles within this over-all size range, it is particularly suitable for the preparation of spherical contact particles whose diameter is in the range of 30 mesh to 2 mesh.

While the various objects and advantages of the present invention are apparent from the foregoing detailed description, the additional descriptive statements hereinafter, taken with the accompanying drawings, will also serve to illustrate the present invention. However, while the use of a particular expressing device and shaping apparatus is not essentially a part of the present invention, a description of the equipment and materials employed in conducting the process of this invention is deemed advantageous. Thus, in the drawings:

FIGURE 1 is a flow diagram of the process according to the present invention;

FIGURE 2 is a plan view of a die having orifices through which the deformable plastic contact mass is expressed or extruded; a nozzle through which a fluid medium is passed so as to break or to slice the extrudates, and a shaping apparatus, i.e., a cyclone separator wherein centrifugal forces are imparted to the broken or sliced extrudates; and FIGURE 3 is a section taken through the cylone along lines 3—3 of FIGURE 2.

As will be seen from FIGURE 1, a powder and a slurry of suitable composition are blended with a plasticizer in a muller 11 while a cake of suitable composition is passed through a second muller 11 and the mulled materials are admitted to the hopper 12 of a double worm screw extruder 13 supplied by the Welding Engineers Company, series 2000, driven by a 7.5 horsepower motor at a selected r.p.m. of either 50 or 70. The main screw of the extruder was a constant depth, deep screw which was coated with wax or with a polyfluorohydrocarbon resin and which had a true displacement of 2.3 inches per revolution. The die 14 was machined from a 2″ diameter polyfluorohydrocarbon resin rod. The die depth was 1″ and the die holes were drilled either as a single row across a diameter of the face (¼ and ³⁄₁₆″) or over the entire face of the die on a 60° triangular pitch (³⁄₃₂ and ¹⁄₁₆″). The die was inserted into a steel collar which was threaded on each end for connection to the extruder and the shaping apparatus.

The shaping apparatus was a cyclone 17 ordinarily employed for the separation of solid particles from fluid streams. A turbo-blower 15 capable of developing 4 p.s.i.g. at 300 c.f.m. supplied air for cutting and beading. The air was metered through an orifice and introduced into the cyclone by a flat nozzle 16 with an opening 3 x ⁵⁄₁₆″. The cyclone was connected to the extruder by a coupling welded into the entrance duct, into which was screwed the steel collar containing the polyfluorohydrocarbon die having an exposed die face 1.5″ diameter, and brought flush to the inside of the entrance duct wall. The air nozzle was then adjusted so that the air would be directed across the exposed die face.

The cyclone was constructed of sheet stainless steel having a fairly smooth finish. The bottom discharge was modified by a ¼–½″ shoulder which substantially increased the particle residence time in the system. The product discharged from the cyclone was collected continuously, either by trays or by a gyratory screen which also served to classify the material.

The beaded product was dried by employing forced circulation tray dryers 18. However, a rotary drier may also be used with advantage. For calcination of the dried spherical contact particles, an indirectly fired rotary calciner of kiln 19 was used.

In order to illustrate the method of the present invention, the following examples are given:

EXAMPLE 1

A hydrogel of approximately 50% synthetic silica and 50% Georgia kaolin is prepared in accordance with the following procedure. Heel water (1250 lbs.) and 42% solids clay slip (186 lbs.) are run into a strike tank and heated to 95–100° F. A 28.5% sodium silicate solution (434 lbs.) is added from a measuring tank. The agitator is started while at the same time 25% sulfuric acid (400 lbs.) is run into the strike tank over a 15 minute period. The batch is then aged for 30 minutes and the pH is adjusted to 4.5. The material is then diluted with an equal weight of water, dewatered and washed twice by an amount of water equal to the weight of the original portion. The cakes removed from the filter crocks are from 17–19% solids.

The cake is then diluted to 5% solids, heated to approximately 80° C. and reacted for 2 to 3 hours with magnesia to give 23% MgO, dry basis. At the end of the reaction time, a 1% aqueous solution of polyacrylamide is added to give 1% polymer on solids and the slurry is centrifuged.

The resultant deformable plastic contact mass of 24% solids is then extruded using the extruder described hereinbefore through a die having orifices of ³⁄₁₆″ in diameter. The extrusion rate is varied from about 2.5 lbs./min. to 2.8 lbs./min. and 7.7″ a second to 8.8″ a second. The extrudates from the die are cut into short lengths of ³⁄₁₆″ cylindrical pellets by air which is supplied to the nozzle at a rate of 80 to 100 cu. ft./min. and 200 to 275 ft./sec. The cylindrical pellets thus obtained while still in a deformable plastic state are conveyed by the air stream to a cyclone separating device whereby the extrudates are forcibly rotated around the containing walls of the cyclone. The extrudates are formed into balls by this action and under the force of gravity are discharged from the bottom of the cyclone. The spherical contact particles are then dried at 250° F. for 8 hours and subsequently calcined at 1100° F.

The product obtained from this preparation has excellent properties, physically and catalytically, as will be seen from the following comparison with a commercial beaded product which has very wide usage in moving bed catalytic cracking processes.

| Physical Properties | Silica Magnesia Beads | Typical Silica Alumina Commercial Beads |
|---|---|---|
| Apparent bulk density (#/ft.³) | 48 | 55 |
| Pore volume (cc./gm.) | 0.34 | 0.34 |
| Surface area (m.²/gm.) | 331 | 140 |
| Attrition [1] (percent) | 6 | 12 |
| PRODUCT DISTRIBUTION OF MID-CONTINENT GAS OIL | | |
| Gasoline (Vol. percent) | 42.4 | 35.4 |
| Coke (Wt. percent) | 5.5 | 5.4 |
| Gas (Wt. percent) | 13.2 | 17.1 |
| Conversion (Wt. percent) | 57.4 | 54.0 |
| Space Velocity (v./hr./v.) | 3.0 | 2.0 |

[1] The method for determining attrition is described as the air jet attrition test and involved the following procedure: The sample to be tested was heated for three hours at 1050° F. The sample was then screened on a 6 mesh screen and the fines were discharged. A 30 gram charge obtained from that remaining on the 6 mesh screen was introduced into a 1 liter Erlenmeyer flask having a 1″ hole in the bottom covered by a 10 mesh screen. A stopper, slightly concave on the inside into which was inserted a brass nozzle whose end was flush with the inside concave surface of the stopper was fitted to the neck of the flask. The entire assembly was then mounted vertically with the Erlenmeyer flask inverted upon the stopper. Air at 6.1 s.c.f.m. was admitted through a nozzle for one hour. The sample was then removed and screened on a 10 mesh screen. The fines were discarded. The remaining sample is weighed and the percent attrition is obtained by use of the formula $$\frac{30-\text{Final weight}}{30} \times 100$$

EXAMPLE 2

A hydrated alumina for use as a catalyst base is obtained by the following procedure. A heel of water (140 lbs.) is charged into a suitable reaction vessel and is heated to approximately 95° F. The agitator is turned on. An aluminum sulfate solution (36 lbs. of 8% $Al_2O_3$) is then added simultaneously with 68 lbs. of 15% aqueous ammonia over a period of 30 minutes. Temperature during reaction is maintained between 95°–105° F. The precipitated alumina is washed free from salts and other impurities. The alumina is then washed over two stages of filters. After the first stage of washing, the filter cake is repulped with the addition of 1% polyacrylamide, based on alumina solids, filtered and washed over a second stage filter. The second stage filter cake is then dried to approximately 22% solids. Based on a preparation involving 25 lbs. of alumina cake, to this cake is added 1.5 lbs. of finely divided α-cellulose. The mixture is thoroughly blended and mulled. The mulling step is carried out by pre-extruding the mass through holes of larger diameter than the final product.

The thoroughly blended, pre-extruded mixture is fed to the extruder employed in Example 1 with a solids content of about 24% and extruded through a die having orifices of ¹⁄₁₆″ in diameter. The extrusion rate is varied from 2.3 lbs./min. to 2.7 lbs./min. The extrudates emerging from the die are cut in short lengths, approximately ¹⁄₁₆″ to ¼″, by air which is supplied at the rate of 80 to 100 cu. ft./min. The cylindrical extrudates after cutting are quite plastic and deformable and while in this state are conveyed to a cyclone device whereby the extrudates are forcibly rotated around the containing walls of the cyclone. The extrudates are formed into balls by this action and under the force of gravity are discharged from the bottom of the cyclone. The alumina balls are then dried at 250° F. for 8 hours following which they are dried at 1100° F. for 1 hour.

The alumina beads thus obtained are then impregnated with solutions of ammonium molybdate and cobalt nitrate, dried at 250° F. for 4 hours and calcined at 1100° F. for 1 hour. The alumina-molybdenum oxide-cobalt oxide catalyst resulting has substantially improved abrasion resistance and lower density and higher pore volume as will be seen from the following comparison with a conventional extruded catalyst.

|  | Beaded 1/16" Catalyst | Extruded 1/16" Catalyst |
| --- | --- | --- |
| $MoO_3$ (percent) | 15 | 15 |
| $CoO_3$ (percent) | 3 | 3 |
| Surface area (m.$^2$/gm.) | 200 | 220 |
| Pore volume (cc./gm.) | 0.69 | 0.49 |
| Apparent bulk density (#/ft.$^3$) | 35 | 37.6 |
| Abrasion [1] (percent fines 20 mesh) | 0.25 | 4.0 |

[1] The method used to determine abrasion is as follows: A 100 gram sample of catalyst which has been screened through a 20 mesh U.S. standard screen is charged to a baffled steel drum 10¾" in diameter, 5½" long. The drum is rotated at 54 r.p.m. for 30 minutes. At this point, the sample is removed, screened through a 20 mesh screen and the fines recovered and measured. Criterion of abrasion resistance is thus the amount of fines formed, expressed on a percentage basis.

EXAMPLE 3

Alumina filter cake from Example 2 to which 1% polyacrylamide and 6% finely divided α-cellulose, based on solids, had been added is mixed with sufficient hydrous silica gel obtained from precipated sodium silicate, to give a final product in which the alumina to silica ratio is 95/5. The filter cake is dried to about 26%, mulled by pre-extrusion through ⅛" orifices and blended.

The mass is then extruded through a die having 1/40" orifices at extrusion rates of from about 1.8 lbs. to 2.5 lbs./min. The extrudates are cut into short lengths of approximately 0.025" to 0.033" by an air stream supplied at the rate of about 90 cu. ft./min. to 120 cu. ft./min. The cylindrical extrudates after cutting are quite plastic and deformable and while in this state are conveyed by the air stream to a cyclone device whereby the extrudates are forcibily rotated around the containing walls of the cyclone. The extrudates are formed into balls by this action and under the force of gravity are discharged from the bottom of the cyclone. The alumina balls are then dried at 250° F. for 8 hours following which they are dried at 1100° F. for 1 hour.

The alumina beads are then impregnated with solutions of ammonia molybdate and nickel nitrate, dried at 250° F. for 9 hours and calcined at 1100° F. for 1 hour.

The alumina-molybdenum oxide-nickel oxide catalyst has improved activity in hydrodesulfurization reactions as will be seen from the following comparison with an extruded catalyst for desulfurization of catalytically cracked light cycle oil (0.8% sulfur); 600° F. reaction temperature; 600 p.s.i. at 9 WHSV.

|  | 1/40" Beads | 1/16" Extrudates |
| --- | --- | --- |
| $MoO^3$ (percent) | 12.0 | 11.4 |
| NiO (percent) | 3.7 | 3.1 |
| Apparent bulk density (#/ft.$^3$) | 45 | 44 |
| Pore volume (cc./gm.) | 0.51 | 0.51 |
| Surface area (m.$^2$/gm.) | 205 | 180 |
| Activity (percent sulfur in exit) | 0.10 | 0.15 |
| Abrasion (percent fines 20 mesh) | 0.12 | 4.0 |

It will thus be apparent that for diffusion controlled reactions the beading process provides an abrasion resistant catalyst of sufficiently small size to markedly improve activity. Since the extrusion of catalyst pellets directly is economically very disadvantageous at sizes less than 1/16" in diameter, the process of the present invention affords a means of increasing both activity and abrasion resistance.

While the foregoing invention has been described in conjunction with certain preferred embodiments, it is to be understood that numerous other modifications may be made in the process herein without departing from the scope of the invention. Consequently, the invention is to be construed broadly and is to be restricted only by the appended claims.

We claim:

1. A process for preparing spherical contact particles which comprises expressing a deformable plastic contact mass through an orifice to form a deformable plastic extrudate, successively slicing said extrudate from said orifice to form deformable plastic cylinders, shaping said deformable plastic cylinders by means of centrifugal forces only while carrying and maintaining said cylinders in a moving fluid medium so as to form substantially spherical contact particles and heat treating said spherical contact particles.

2. A process for preparing spherical contact particles which comprises expressing a deformable plastic contact mass through an orifice to form a deformable plastic extrudate, successively breaking said extrudate from said orifice to form deformable plastic cylinders, shaping said deformable plastic cylinders by means of centrifugal forces only while carrying and maintaining said cylinders in a moving fluid medium so as to form substantially spherical contact particles and heat treating said spherical contact particles.

3. A process for preparing spherical contact particles which comprises expressing a deformable plastic contact mass through an orifice having a diameter approximately equal to that of said spherical contact particles to form a deformable plastic extrudate, successively slicing said extrudate from said orifice by means of a moving fluid medium to form deformable plastic cylinders whose length is approximately equal to the diameter of said contact particles, shaping said deformable plastic cylinders by means of centrifugal forces only while carrying and maintaining said cylinders in said fluid medium so as to form substantially spherical contact particles and heat treating said spherical contact particles.

4. A process for preparing spherical contact particles which comprises expressing a deformable plastic contact mass through an orifice having a diameter approximately equal to that of said spherical contact particles to form a deformable plastic extrudate, successively breaking said extrudate from said orifice by means of a moving fluid medium to form deformable plastic cylinders whose length is approximately equal to the diameter of said contact particles, shaping said deformable plastic cylinders by means of centrifugal forces only while carrying and maintaining said cylinders in said fluid medium so as to form substantially spherical contact particles and heat treating said spherical contact particles.

5. The process as in claim 1 in which said deformable plastic contact mass comprises an inorganic oxide gel.

6. The process as in claim 2 in which said deformable plastic contact mass comprises an inorganic oxide gel.

7. The process as in claim 3 in which said deformable plastic contact mass comprises an inorganic oxide gel.

8. The process as in claim 4 in which said deformable plastic contact mass comprises an inorganic oxide gel.

9. The process as in claim 1 in which said moving fluid medium is air.

10. The process as in claim 2 in which said moving fluid medium is air.

11. The process as in claim 3 in which said moving fluid medium is air.

12. The process as in claim 4 in which said moving fluid medium is air.

13. The process as in claim 2 in which said deformable plastic mass comprises an inorganic oxide gel and a plasticizer.

(References on following page)

References Cited in the file of this patent

UNITED STATES PATENTS

| | | |
|---|---|---|
| 1,751,430 | Thomson | Mar. 18, 1930 |
| 2,867,000 | Huszar | Jan. 6, 1959 |
| 2,881,503 | Johnson | Apr. 14, 1959 |
| 2,904,827 | Kaiser et al. | Sept. 22, 1959 |
| 2,911,669 | Beckwith | Nov. 10, 1959 |
| 2,911,672 | Dorens et al. | Nov. 10, 1959 |
| 2,932,061 | Jansen | Apr. 12, 1960 |
| 2,938,230 | Sainty | May 31, 1960 |
| 2,963,824 | Pinotti | Dec. 13, 1960 |
| 3,036,333 | Sainty | May 29, 1962 |

FOREIGN PATENTS

| | | |
|---|---|---|
| 1,244,441 | France | Sept. 19, 1960 |